United States Patent
Kim et al.

(10) Patent No.: US 9,484,998 B2
(45) Date of Patent: *Nov. 1, 2016

(54) ANTENNA ALLOCATION APPARATUS AND METHOD FOR CELLULAR MOBILE COMMUNICATION SYSTEM

(71) Applicant: Samsung Electronics Co., Ltd., Gyeonggi-do (KR)

(72) Inventors: Youn Sun Kim, Gyeonggi-do (KR); Young Bum Kim, Seoul (KR); Hyojin Lee, Seoul (KR); Joon Young Cho, Gyeonggi-do (KR); Ju Ho Lee, Gyeonggi-do (KR); Jin Kyu Han, Seoul (KR); Cheng Shan, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,674

(22) Filed: Apr. 6, 2015

(65) Prior Publication Data

US 2015/0215020 A1    Jul. 30, 2015

Related U.S. Application Data

(63) Continuation of application No. 13/302,616, filed on Nov. 22, 2011, now Pat. No. 9,001,677.

(30) Foreign Application Priority Data

Nov. 22, 2010 (KR) .................. 10-2010-0116020

(51) Int. Cl.
*H04B 7/06* (2006.01)
*H04L 5/00* (2006.01)
(Continued)

(52) U.S. Cl.
CPC ............ *H04B 7/0608* (2013.01); *H04L 5/0023* (2013.01); *H04L 5/0032* (2013.01);
(Continued)

(58) Field of Classification Search
None
See application file for complete search history.

(56) References Cited

U.S. PATENT DOCUMENTS

2005/0176401 A1    8/2005  Nanda et al.
2010/0041428 A1    2/2010  Chen et al.
(Continued)

FOREIGN PATENT DOCUMENTS

CN    101496306    7/2009
CN    101610135    12/2009
(Continued)

OTHER PUBLICATIONS

Russian Office Action dated Jul. 3, 2015 issued in counterpart application No. 2013123279/07, 17 pages.
(Continued)

*Primary Examiner* — Gary Mui
(74) *Attorney, Agent, or Firm* — The Farrell Law Firm, P.C.

(57) ABSTRACT

Methods and apparatuses are provided for communicating with a terminal of a base station in a mobile communication system. Configuration information on a plurality of antenna ports of reference signals (RSs) which comprise first type antenna ports and second type antenna ports, is transmitted. Status information for at least one antenna port of an RS among the plurality of antenna ports of the RSs, is received. At least one indicator indicating at least one selected antenna port of an RS is transmitted based on the status information. The terminal is communicated with using the at least one selected antenna port of the RS. The first type antenna ports are for a centralized antenna and the second type antenna ports are for a distributed antenna.

20 Claims, 8 Drawing Sheets

(51) Int. Cl.
*H04W 74/00* (2009.01)
*H04W 24/02* (2009.01)

(52) U.S. Cl.
CPC ........... *H04L5/0048* (2013.01); *H04L 5/0069* (2013.01); *H04L 5/0091* (2013.01); *H04W 74/002* (2013.01); *H04L 5/006* (2013.01); *H04L 5/008* (2013.01); *H04L 5/0057* (2013.01); *H04W 24/02* (2013.01)

(56) References Cited

U.S. PATENT DOCUMENTS

| | | | |
|---|---|---|---|
| 2010/0069122 | A1 | 3/2010 | Ito |
| 2010/0238821 | A1 | 9/2010 | Liu et al. |
| 2010/0254471 | A1 | 10/2010 | Ko et al. |
| 2011/0299573 | A1 | 12/2011 | Sun et al. |
| 2011/0317581 | A1 | 12/2011 | Hoshino et al. |
| 2012/0051451 | A1 | 3/2012 | Kwon et al. |
| 2012/0106501 | A1 | 5/2012 | Kishiyama et al. |
| 2012/0314563 | A1 | 12/2012 | Luo et al. |
| 2012/0322477 | A1* | 12/2012 | Kang ............... H04B 7/022 455/501 |
| 2013/0010744 | A1 | 1/2013 | Kang et al. |
| 2013/0040676 | A1* | 2/2013 | Kang ............... H04B 7/0495 455/509 |
| 2013/0053050 | A1* | 2/2013 | Kang ............... H04B 7/022 455/452.1 |

FOREIGN PATENT DOCUMENTS

| | | |
|---|---|---|
| EP | 2 552 032 | 1/2013 |
| JP | 2010-068496 | 3/2010 |
| JP | 2010-219817 | 9/2010 |
| RU | 2 322 764 | 4/2008 |
| WO | WO 2006/133602 | 12/2006 |
| WO | WO 2010/008859 | 1/2010 |
| WO | WO 2010/073293 | 7/2010 |
| WO | WO 2010/106729 | 9/2010 |
| WO | WO 2011/097785 | 8/2011 |

OTHER PUBLICATIONS

Australian Examination Report dated Oct. 8, 2015 issued in counterpart application No. 2011332521, 2 pages.
Japanese Office Action dated Mar. 29, 2016 issued in counterpart application No. 2013-539753, 6 pages.
Chinese Office Action dated May 11, 2015 issued in counterpart application No. 201180056118.0.
Japanese Office Action dated May 25, 2015 issued in counterpart application No. 2013-539753.
3rd Generation Partnership Project; Technical Specification Group Radio Access Network; Evolved Universal Terrestrial Radio Access (E-UTRA); Further Advancements for E-UTRA Physical Layer Aspects (Release 9), 3GPP TR 36.814 V9.0.0, Mar. 2010.
Qinghua Li et al., "MIMO Techniques in WiMAX and LTE: A Feature Overview", Topics in Wireless Communications, IEEE Communications Magazine, May 2010.
Thomas et al., "CSI Reference Signal Designs for Enabling Closed-Loop MIMO Feedback", 2010 IEEE 72nd Vehicular Technology Conference (VTC 2010-Fall), Sep. 9, 2010.
Ericsson, ST-Ericsson, "Further Details on CSI RS Configuration", R1-105322, 3GPP TSG-RAN WG1 #62bis, Oct. 11-15, 2010, 4 pages.
Motorola, "CoMP Support in Rel-10: Performance with Intra-eNB CoBF and Cell-Edge Improvements", R1-101130, 3GPP TSG RAN1 #60, Feb. 22-26, 2010, 11 pages.
Huawei, "Consideration on CoMP for LTE-Advanced", R1-083049, 3GPP TSG RAN WG1#54, Aug. 18-22, 2008, 3 pages.
Mitsubishi Electric, "UL Sounding RS Control Signaling for Closed Loop Antenna Selection", R1-080803, 3GPP RAN1#52, Feb. 11-15, 2008, 7 pages.
European Search Report dated Sep. 15, 2016 issued in counterpart application No. 11843460.4-1851, 17 pages.
European Search Report dated Jun. 28, 2016 issued in counterpart application No. 11843460.4-1851, 6 pages.

* cited by examiner

ANTENNA ALLOCATION APPARATUS AND METHOD FOR CELLULAR MOBILE COMMUNICATION SYSTEM

PRIORITY

This application is a Continuation Application of U.S. patent application Ser. No. 13/302,616, filed in the U.S. Patent and Trademark Office on Nov. 22, 2011, which claims priority under 35 U.S.C. §119(a) to Korean Application Serial No.10-2010-0116020, filed in the Korean Intellectual Property Office on Nov. 22, 2010, the contents of which are incorporated herein by reference.

BACKGROUND OF THE INVENTION

1. Field of the Invention

The present invention relates generally to allocating antennas in a communication system, and more specifically, to a method and apparatus for selecting and allocating antennas efficiently in a cellular mobile communication system based on a Distributed Antenna System (DAS).

2. Description of the Related Art

Mobile communication systems have evolved into a high-speed, high-quality wireless packet data communication systems that provide data and multimedia services in addition to the voice-oriented services provided through early mobile communication systems. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support such high-speed, high-quality wireless packet data communication services. In particular, LTE has been is a technology capable of facilitating such high speed packet data transmission and maximizing the throughput of the radio communication system with various radio access technologies. LTE-Advanced (LTE-A) is an evolved version of LTE that improves the data transmission capabilities of LTE.

Existing $3^{rd}$ generation wireless packet data communication systems, such as High-Speed Downlink Packet Access (HSDPA), High-Speed Uplink Packet Access (HSUPA) and High-Rate Packet Data (HRPD) systems, use technologies such as Adaptive Modulation and Coding (AMC) and Channel-Sensitive Scheduling to improve transmission efficiency. Through the use of AMC, a transmitter can adjust an amount of transmission data according to a channel state. When the channel state is below a certain quality level (i.e., a 'Poor' channel state), the transmitter reduces the amount of transmission data to adjust the reception error probability to a desired level, and when the channel state is at or above a certain quality level (i.e., a "Good" channel state), the transmitter increases the amount of transmission data to adjust the reception error probability to the desired level, thereby efficiently transmitting a large volume of information. With the use of the Channel-Sensitive Scheduling-based resource management method, the transmitter selectively provides services to a user having a better channel state from amongst several users, thus increasing the system capacity, in contrast to methods that include allocating a channel to one user and servicing the user with the allocated channel. This capacity increase is referred to as multi-user diversity gain. The AMC technique and the Channel-Sensitive Scheduling methods each include applying an appropriate modulation and coding scheme at a most-efficient time determined according to partial channel state information fed back from a receiver.

In conjunction with a Multiple Input and Multiple Output (MIMO) scheme, the AMC technique can be used to determine a number of spatial layers for transmission or rank. When using the AMC technique in this manner, the AMC scheme is implemented in consideration of the number of layers to be used in MIMO transmission as well as a coding rate and modulation level.

Meanwhile, research is being conducted in order to find ways to replace the Code Division Multiple Access (CDMA) as the multiple access scheme of the $2^{nd}$ and $3^{rd}$ generation mobile communication systems for Orthogonal Frequency Division Multiple Access (OFDMA) in next generation systems. 3GPP and 3GPP2 have started standardization of evolved systems using OFDMA. OFDMA utilizes a larger system capacity than a system capacity utlitilized through CDMA. One of the significant factors contributing the increase of system capacity of OFDMA relative to CDMA is the use of frequency domain scheduling. Similar to the channel sensitive scheduling based on the time-varying characteristic of channels, it is possible to obtain more capacity gain by using the frequency-varying characteristic of the channels.

In conventional technologies, the cellular system is configured with a plurality of cells as shown in FIG. 1 in order to provide mobile communication with the aforementioned techniques.

FIG. 1 is a schematic diagram illustrating a cellular system including three cells each centered around an antenna.

Referring to FIG. 1, a cellular system includes three cells 100, 110, and 120, and reference numeral 160 denotes an exemplary configuration of the cell 100. The cell 100 is centered around the antenna 130 and serves User Equipments (UEs) 140 and 150 in its coverage area. The antenna 130 provides the UEs 140 and 150 located in the cell 100 with a mobile communication service. The UE 140 is located further away from the antenna 130 than the UE 150, such that the UE 140 is served by the antenna 130 at a lower data rate than the UE 130.

As shown in FIG. 1, each cell is configured in the form of a Central Antenna (CAS) antenna system in which the cell is centered around the antenna. In CAS, although multiple antennas are allocated to each cell, the antennas are arranged at the center of the cell to serve the UEs in the service area. In case that antennas in each cell of a cellular mobile communication system are arranged and managed in the form of CAS as shown in FIG. 1, it is necessary to transmit reference signals for measuring downlink channel condition for each cell. In a 3GPP LTE-A system, a UE measures the channel status between the UE and an evolved Node B (eNB) using a Channel Status Information Reference Signal (CSI-RS) transmitted by the eNB.

FIG. 2 is a diagram illustrating a configuration of a resource block including CSI-RSs transmitted by the eNB.

Referring to FIG. 2, reference numerals 200 to 219 denote paired positions paired for signals of two CSI-RS antenna ports. For example, the eNB transmits the downlink estimation signals for two CSI-RS antenna ports at the position 200. When the cellular system includes of a plurality of cells, such as in the example shown in FIG. 2, the CSI-RS can be transmitted at the positions allocated for each cell. For example, the cellular system can be configured such that the cell 100 of FIG. 1 transmits CSI-RS at positions 200 of FIG. 2, while the cell 110 transmits CSI-RS at positions 205, and the cell 120 transmits CSI-RS at positions 210.

The different time-frequency resources are allocated for CSI-RS transmission of different cells in order to prevent the CSI-RSs of the different cells from interfering with each other.

When using the CAS method as shown in FIG. 1, the transmit/receive antennas of each eNB are concentrated at the center of the cell such that, there are limited capabilities for serving UEs located at the cell edge at a high date rate. Therefore, the data rate for providing the communication service to the UE within the CAS-based cell is determined significantly according to the location of the UE. In this respect, in conventional cellular mobile communication systems operating with calls centered around antennas, UEs located at cell edges cannot be effectively served. Meanwhile, in such conventional cellular mobile communication systems, UEs located near the center of cells can communicate at a high data rate.

SUMMARY OF THE INVENTION

In order to solve the above-described problems, embodiments of the present invention provides an antenna allocation method and apparatus that is capable of improving system performance by configuring Distributed Antenna System (DAS) and selecting and allocating the distributed antennas efficiently.

According to an aspect of the present invention, a method is provided for communicating with a terminal of a base station in a mobile communication system. Configuration information on a plurality of antenna ports of reference signals (RSs) which comprise first type antenna ports and second type antenna ports, is transmitted. Status information for at least one antenna port of an RS among the plurality of antenna ports of the RSs, is received. At least one indicator indicating at least one selected antenna port of an RS is transmitted based on the status information. The terminal is communicated with using the at least one selected antenna port of the RS. The first type antenna ports are for a centralized antenna and the second type antenna ports are for a distributed antenna.

According to another aspect of the present invention, a method is provided for communicating with a base station of a terminal in a mobile communication system. Configuration information on a plurality of antenna ports of RSs which comprise first type antenna ports and second type antenna ports, is received. Status information for at least one antenna port of an RS among the plurality of antenna ports of the RSs, is transmitted. At least one indicator indicating at least one selected antenna port of an RS is received. The base station is communicated with using the at least one selected antenna port of the RS. The first type antenna ports are for a centralized antenna and the second type antenna ports are for a distributed antenna.

According to another aspect of the present invention, a base station is provided for communicating with a terminal in a mobile communication system. The base station includes a transceiver for transmitting and receiving signals to and from the terminal. The base station also includes a controller configured to control the transceiver to transmit configuration information on a plurality of antenna ports of RSs which comprise first type antenna ports and second type antenna ports, to receive status information for at least one antenna port of an RS among the plurality of antenna ports of the RSs, to transmit at least one indicator indicating at least one selected antenna port of an RS based on the status information, and to communicate with the terminal using the at least one selected antenna port of the RS. The first type antenna ports are for a centralized antenna and the second type antenna ports are for a distributed antenna.

According to still another aspect of the present invention, a terminal is provided for communicating with a base station in a mobile communication system. The terminal includes a transceiver for transmitting and receiving signals to and from the terminal. The terminal also includes a controller configured to control the transceiver to receive configuration information on a plurality of antenna ports of RSs which comprise first type antenna ports and second type antenna ports, and to transmit status information for at least one antenna port of an RS among the plurality of antenna ports of the RSs, to receive at least one indicator indicating at least one selected antenna port of an RS, and to communicate with the base station using the at least one selected antenna port of the RS. The first type antenna ports are for a centralized antenna and the second type antenna ports are for a distributed antenna.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
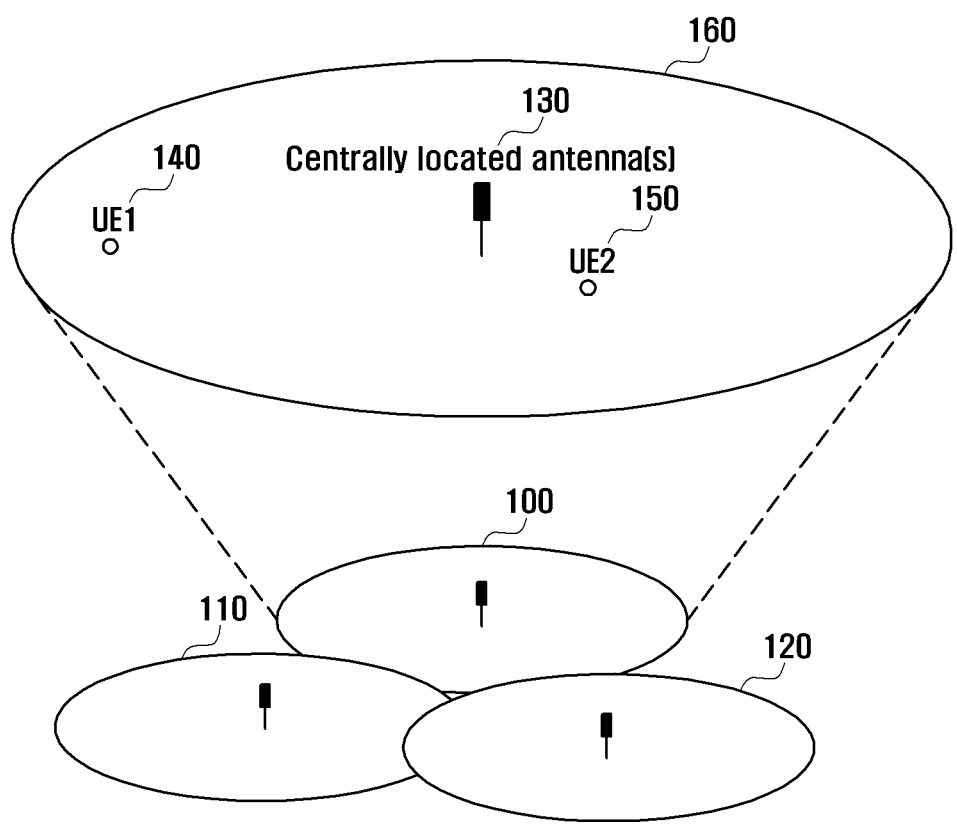
FIG. 1 is a schematic diagram illustrating a cellular system including three cells each centered around an antenna.
Figure 2:
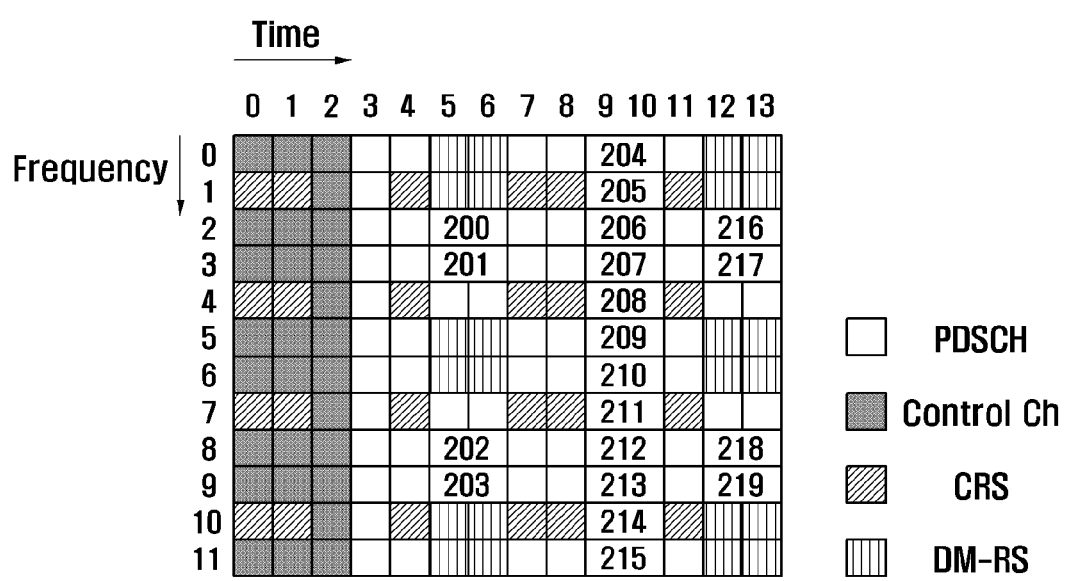
FIG. 2 is a diagram illustrating a configuration of a resource block including CSI-RSs transmitted by the eNB.

Embodiments of the present invention are described as follows with reference to the accompanying drawings. Detailed descriptions of well-known functions and structures incorporated herein may be omitted in order to avoid obscuring the subject matter of the present invention. Further, terms in the following description are defined in consideration of the functionality in the present invention. Therefore, the definitions of terms are based upon the overall content of the present specification.

Although a detailed description of the present invention is provided with reference to an OFDM-based mobile communication system, and in particular, to a 3GPP EUTRA standard, as an example, embodiments of the present invention can be applied to other communication systems having the similar technical background and channel format through appropriate modification, without departing from the spirit and scope of the present invention.

A cellular mobile communication system is typically implemented by deploying a plurality of cells in a restricted area. Each cell includes a base station facility placed at the center to provide a mobile communication service. The base station facility includes antennas for transmitting/receiving radio signals and a signal processing part to provide the mobile communication service to the UEs within the cell. Such a system in which the antennas are concentrated at the center of the system is referred to as Centralized Antenna System (CAS).

A Distributed Antenna System (hereinafter, referred to as DAS), by contrast, is built with antennas distributed within a given cell, i.e., a service area of an eNB, so as to provide the improved mobile communication service as compared to CAS. According to embodiments of present invention, a DAS-based communication system capable of distributing antennas within the service area of each eNB and selecting and allocating the antennas efficiently is provided. More specifically, embodiments of the present invention may provide a system control method that includes selecting and allocating antennas efficiently in a DAS-based cellular mobile communication system including a plurality of eNBs, such that each of the eBNs manages the antennas distributed within the cell.

As aforementioned, in the CAS-based system, the data rate available for the UE is significantly influenced by the location within the cell. A UE located near the center of the cell can be served at higher data rate than a data rated provided to a UE located at the cell edge. Embodiments present invention may address this problem in the cellular mobile communication system through a DAS solution.

In the following description according to embodiments of the present invention, new terms/concepts are defined, including, but not limited to as D-port, C-port, D-port active set, candidate set, and superset. According to an embodiment of the present invention, the eNB can notify the UE of the D-port set through UE-specific signaling. After the D-port set notification, the eNB can reconfigure the D-port set according to the feedback from the UE. The D-port and C-port in the same cell can be distinguished from each other by according to allocation of time-frequency resources, and the D-port can be distinguished according to separate time-frequency resources or, when multiple D-ports use the same time frequency resource, the D-ports can be distinguished according to scrambling sequences. The received signal strength of a D-port can be used for link adaption and switching between D-ports, and the received signal of a C-port can be used to switch between cells. According to an embodiment of the present invention, if entry of a UE is detected, the eNB informs the UE of multiple available CSI-RS configurations (or superset) through UE-specific signaling. Afterward informing the UE, if multiple CSI-RS measurement result values (received signal strengths measured by UE) are received from the UE, the eNB transmits allocation-available transmission positions (i.e., a candidate set) determined based on the CSI-RS measurement result values to the UE. After receiving the candidate set, if the feedback information, including the transmission position information, is received from the UE, the eNB transmits PDSCH data to the UE through the antennas (DAS and/or CAS) configured based on the feedback information.

If multiple CSI-RS configurations (i.e., a superset) are received through UE-specific signaling, the UE measures the received signal strengths of the configured CSI-RSs and transmits the measurement results to the eNB. After the measurement results are transmitted, if the allocation-available transmission positions set (i.e., a candidate set) is received from the eNB, the UE transmits the feedback information, which includes transmission position information.

According to another embodiment of the present invention, if a UE entry is detected, the eNB, sends, to the UE, a request to transmit an SRS. If the requested SRS is received from the UE, the eNB measures the received signal strength of the SRS transmitted by the UE at distributed positions. After measuring the received signal strength, the eNB transmits, to the UE, the transmission position set (or candidate set) configured based on the received signal strength and transmission power. If the feedback information, which includes the transmission positions information, is received from the UE, the eNB transmits PDSCH data to the UE through the antennas (DAS and/or CAS) configured based on the feedback information.

Upon receiving the SRS request from the eNB, the UE transmits the SRS to the eNB. After transmitting the SRS to the eNB, if the allocation-available transmission positions set (or candidate set) is received from the eNB, the UE transmits the feedback information including transmission position information to the eNB.

Figure 3:
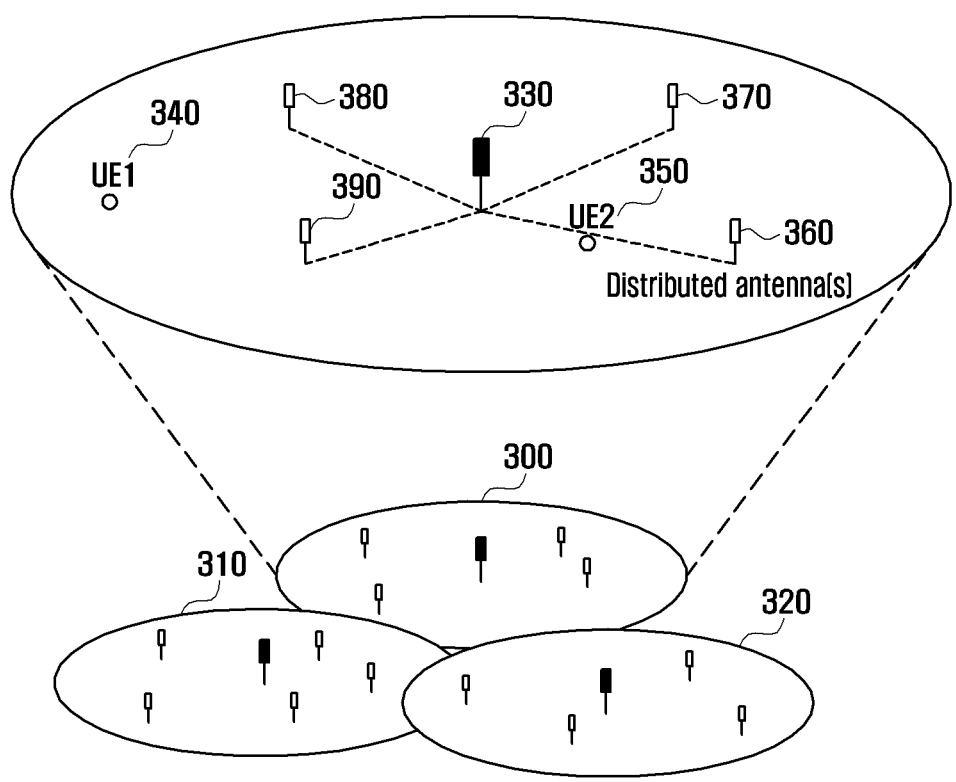
FIG. 3 is a diagram illustrating a configuration of a distributed antenna system-based cellular mobile communication system having the transmit/receive antennas distributed on a per—cell-basis according to an embodiment of the present invention.

FIG. 3 is a diagram illustrating a configuration of the distributed antenna system-based cellular mobile communication system where transmit/receive antennas distributed in each cell according to an embodiment of the present invention.

The following description corresponding to the communication system of FIG. 3 is directed to an example where each cell includes a center antenna and four distributed antennas.

Referring to FIG. 3, a cellular mobile communication system according to an embodiment of the present invention includes three cells 300, 310, and 320. Cell 300 is provided with a center antenna 330 positioned at a center of the cell 300 and four distributed antennas 360, 370, 380, and 390 distributed within a service area of the cell 300. The antennas 330, 360, 370, 380, and 390 of the cell 300 serve two UEs 340 and 350 to provide a mobile communication service. The distributed antennas 360, 370, 380, and 390 are connected to and controlled by the center antenna 330. The connection between the center antenna 330 and the distributed antennas 360, 370, 380, and 390 can be established through various methods. The center antenna 330 and the distributed antennas 360, 370, 380, and 390, which belong to one cell of the DAS-based system, are connected to a base station facility so as to be controlled in centralized manner. In the DAS-based system of FIG. 3, the distance between the UE 340 and any of the antennas 330, 360, 370, 380, and 390 and the distance between the UE 350 and any of the antennas 330, 360, 370, 380, and 390 comparatively less than distances between corresponding antennas in a CAS-based system. In order to manage the DAS-based system as shown in FIG. 3, the CSI-RS resources for the respective antennas 330, 360, 370, 380, and 390 are assigned.

Figure 4:
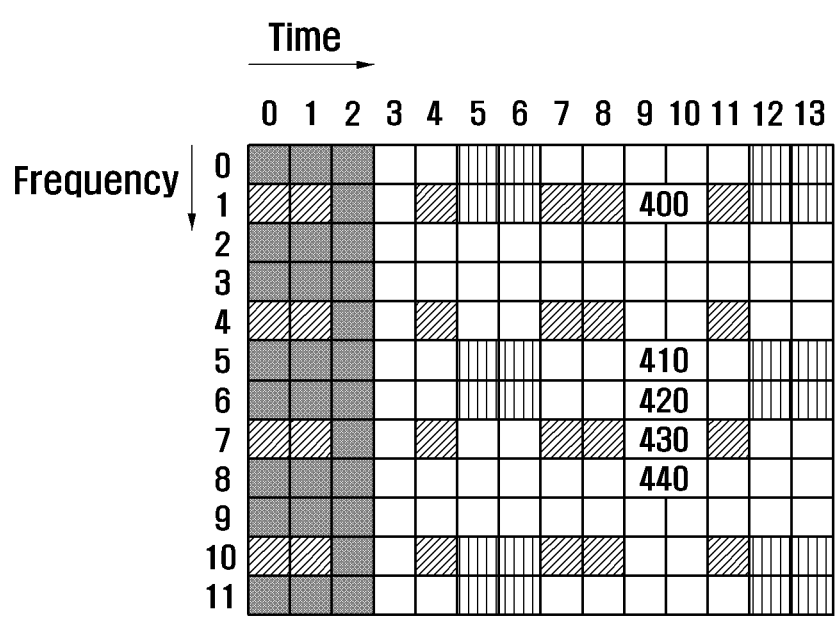
FIG. 4 is a diagram illustrating the configuration of a resource block for allocating CSI-RS resources to multiple antennas belonging to a cell in a DAS-based system according to an embodiment of the present invention.

FIG. 4 is a diagram illustrating a configuration of a resource block for allocating CSI-RS resource to multiple antennas belonging to a cell in a DAS-based system according to an embodiment of the present invention.

The CSI-RS resource allocation of FIG. 4 corresponds to the DAS-based system of FIG. 3, such that the CSI-RS resource elements 400 of FIG. 4 are allocated to the center antenna 330 of FIG. 3, while resource elements 410, 420, 430, and 440 of FIG. 4 are allocated to the distributed antennas 360, 370, 380, and 390 of FIG. 3, respectively.

In accordance with embodiments of the present invention, building and managing of a DAS-based system may be performed in consideration of a new centralized antenna port and a new distributed antenna port, which are described in detail as follows:

First, a centralized antenna port (hereinafter, referred to as a C-port) is an antenna port that supports channel measurement within an entire service area of a cell and can be used by both DAS-enabled UEs and normal UEs. In the LTE-A system, the antenna ports transmitting the Cell-specific Reference Signal (CRS) and CSI-RS that can be received within the entire service area of the cell belong to this category. Second, a distributed antenna port (hereinafter, referred to as a D-port) is an antenna port that can be used by only the DAS-enabled UE and supports the channel measurement in a restricted part of the cell. In the LTE-A system, distributed antennas transmitting the CSI-RS allowing channel estimation in a certain part of the cell belongs to this category.

In a DAS-based system according to an embodiment of the present invention, the physical antennas may be categorized as follows:

First, the centralized antenna (C-Ant) (e.g., antenna 330 of FIG. 3) is placed at (or near) a center of the cell, and is configured with the transmit power level and location allowing the transmission signal to reach the edge of the cell. Second, the distributed antennas (D-Ant) (e.g., antennas 360, 370, 380, and 390) are distributed outward from the center of the cell, and are configured with transmit power levels and locations allowing the transmission signal to reach a predetermined distance within the cell. The C-port and D-port are logical antennas recognized by the UE independently. However the eNB can use the centralized antenna or the distributed antennas to implement a specific antenna port or, if necessary, a combination of multiple centralized antennas or distributed antennas.

According to an embodiment of the present invention, an indexing scheme is defined in order to discriminate among D-ports for supporting efficient DAS communication in the mobile communication standards. The D-port indexing may be applied to the eNB and UE in the same manner and can be managed in a cell-specific manner for all of the UEs in a DAS or in a UE-specific manner.

The C-port and D-port can be distinguished from each other by allocating different time-frequency resources to each port. Since the C-port CRS is allocated different frequency-time resources than those allocated for CSI-RS, no separate resource allocation is necessary for port discrimination. Meanwhile, since the CSI-RS can be transmitted by both the C-port and D-port, a certain time-frequency resource is allocated in order to discriminate between the C-port and D-port. In the example illustrated in FIG. 4, it is possible that the C-port CSI-RS is transmitted in the resource 400 while the D-port CSI-RS is transmitted in the resources 410, 420, 430, and 440.

The C-port and D-port operating in a cell of a system according an embodiment of the present invention may have the following features:

First, the C-port and D-port reference signals area transmitted in the respective time-frequency resources. More specifically, the C-port CSI-RS and the D-port CSI-RS are not be transmitted on the same resource element group among the available CSI-RS resource element groups as shown in FIG. 4. Second, the D-port reference signal is transmitted through individual time-frequency resources or with different scrambling sequences. More specifically, two D-port CSI-RSs can be transmitted on different time-frequency resources or on the same time-frequency resource with different scrambling sequences.

The different D-port reference signals can be mapped on the same time-frequency resource with different scrambling sequences, since the D-port reference signals are transmitted at a transmit power level only enough to cover a restricted area. More specifically, the D-ports located far enough from each other can transmit CSI-RSs on the same time-frequency resource with different scrambling sequences to randomize the interference as much as possible. According to an embodiment of the present invention, the C-port may be always assigned the time-frequency resource separately, since the C-port reference signal may be transmitted to cover the entire service area of the cell.

In order to secure the efficient communication in the DAS-based mobile communication system, the best C-port and/or the best D-port may be selected.

Figure 5:
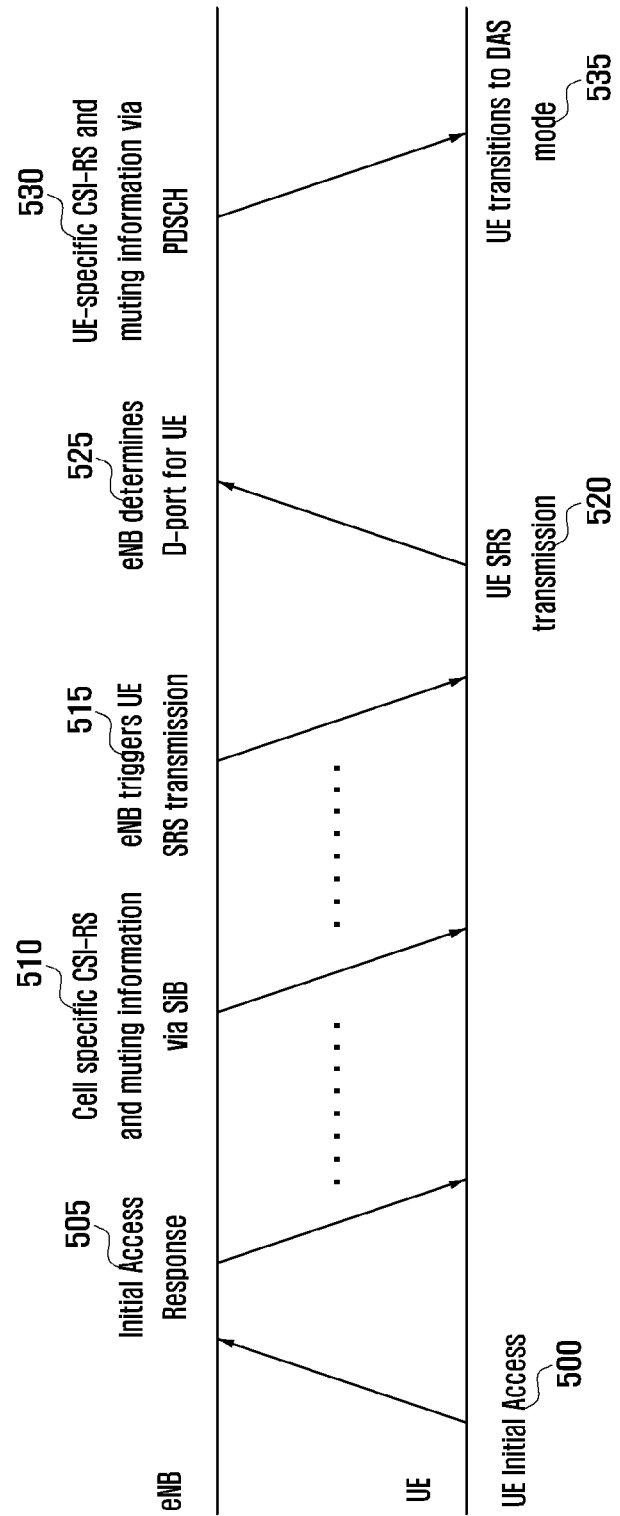
FIG. 5 is a diagram illustrating signaling between an eNB and a UE for allocating D-ports in the DAS-based LTE-A system according to an embodiment of the present invention.

FIG. 5 is a diagram illustrating the signaling between an eNB and a UE for allocating D-port in the DAS-based LTE-A system according to an embodiment of the present invention.

Referring to FIG. 5, a UE attempts initial access to a certain cell at the time point 500. Upon receiving the initial access request, an eNB sends an initial access response signal to the UE in order to notify the UE of successfully performing the initial access at step 505. Once the initial access succeeds, the UE can connect to a corresponding cell to receive a downlink signal. After the initial access is performed, the eNB transmits cell-specific CSI-RS related configuration information (e.g., cell-specific CSI-RS and muting information via SIB) to UEs within the cell, at time point 510. The cell-specific CSI-RS related configuration information is information broadcast periodically to all UEs within the cell. The information transmitted at time point 510 corresponds to the C-port CSI-RS information of the corresponding cell.

The eNB sends, to the UE, a request to transmit an SRS (e.g., eNB-triggered UE SRS transmission), at time point 515. Upon receiving the SRS transmission request, the UE transmits the SRS (e.g., a UE SRS transmission), at time point 520. The SRS is an uplink reference signal transmitted from the UE to the eNB in order for the eNB to check the uplink channel status of the UE. The eNB also can check the average downlink channel status by referencing the uplink channel status measured based on the SRS. More specifically, the eNB can send a request to the UE for the SRS transmission and check the downlink channel status based on the SRS transmitted by the UE. The SRS-based downlink estimation can be implemented in various ways according to embodiments of the present invention. For example, one approach to performing SRS-downlink estimation is to measure SINR of the received SRS and estimate SNIR of the downlink using the difference between the transmission powers of the UE and the eNB.

The eNB can determine the downlink based on the SRS transmitted by the UE, at time point 525. The downlinks that may be checked by the eNB include the downlink from the D-port of the eNB to the UE as well as from C-port of the eNB to the UE. The ability to check the downlinks is enabled by receiving the SRS transmitted by the UE through the antennas constituting the C-port and D-port of the eNB separately. More specifically, if the UE transmits the SRS, the eNB can receive the SRS transmitted by the UE through the C-port and D-ports and analyze the states of the downlink associated with the C-port and D-ports using the received SRS. Using the downlink status obtained in this manner, the eNB selects the D-port for the UE to use at the time point 525.

The information on the D-port selected by the eNB at time point 525 is transmitted to the UE through UE-specific signaling at time point 530. According to an embodiment of the present invention, the UE-specific signaling carries the information related to D-port assigned to the corresponding UE, and this information includes the information on the assigned D-port, transmission position of the D-port CSI-RSs, and the information necessary for measuring the D-port CSI-RSs and generating channel feedback. Upon receiving the information from the eNB, the UE transitions to the DAS mode to start communication at time point 535.

In FIG. 5, the eNB selects the D-port for a specific UE in the DAS and notifies the UE of the selected D-port. At this time, the eNB can select one or more D-ports. In order to manage the DAS-based communication efficiently, the D-ports are sorted. An example of a sorting/classification of the D-ports according to an embodiment of the present invention is described as follows:

A D-port superset is a set of all of the D-ports within a cell. A candidate D-port set is a subset of the D-ports that the eNB informs a specific UE about, such that the UE in DAS mode can communicate through some of the D-ports belonging to the candidate D-port set. An active D-port set is a set of D-ports through which the eNB communicates with the UE in a DAS mode and a subset of the candidate D-port set. A request D-port set is set of the D-ports that the UE in DAS mode requests the eNB to incorporate in the candidate D-port set.

Figure 6:
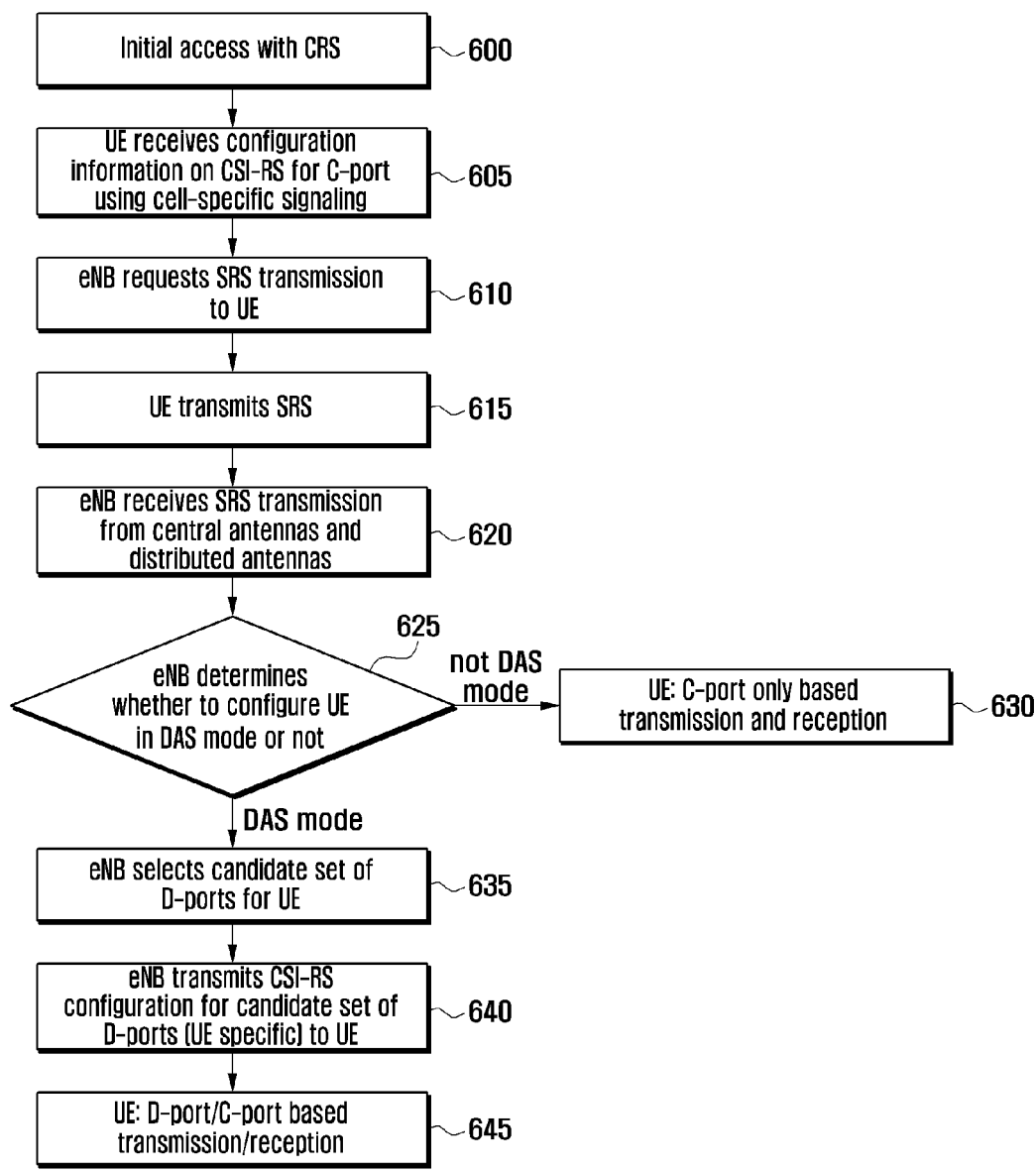
FIG. 6 is a flowchart illustrating a procedure performed by an eNB for allocating D-ports to a UE in a DAS-based LTE-A system according to an embodiment of the present invention.

FIG. 6 is a flowchart illustrating a procedure performed by the eNB for allocating D-ports to a UE in the DAS-based LTE-A system according to an embodiment of the present invention.

Referring to FIG. 6, the UE initially attempts to access a cell through CRS, in step 600. If the initial access request is received from the UE at step 600, the eNB sends an initial access response to the UE. Upon receiving the initial access response, the eNB sends configuration information regarding a CSI-RS for a C-port to the UE, such that the UE receives the configuration information on the CSI-RS for C-port through cell-specific signaling, in step 605. The configuration information on the C-port CSI-RS is cell-specific information broadcast, such that the information may be received in an entire service area of a corresponding cell. Once the information on the C-port CSI-RS is received, the UE can perform communication using the C-port of the corresponding cell.

After the UE receives the configuration information, the eNB sends, to the UE, a request to transmit an SRS, in step 610. Upon receiving the SRS request, the UE transmits the requested SRS such that the eNB can receive SRS through the central and distribute antennas constituting the D-port, in step 615. The eNB receives the SRS through the central and distributed antennas, in step 620. The SRS is an uplink reference signal transmitted from the UE to the eNB, and the eNB can check the uplink channel state of the UE based on the SRS and estimate an average downlink channel state by referencing the uplink channel state.

The eNB determines whether to configure the UE in DAS mode based on the received signal strength of the SRS received per antenna and transmission power of the C-port and D-port, in step 625. Upon a determination not to configure the UE in DAS mode in step 625, the eNB and UE communicate only through the C-port, in step 630. However, upon a determination to configure the terminal in DAS mode, the UE selects a candidate set of D-ports for the UE, in step 635 and transmits, to the UE, CSI-RS configuration for the candidate set of D-ports (UE-specific), in step 640. Once the CSI-RS configuration for the candidate set of D-ports, the UE can perform D-port/C-port based transmission/reception, in step 645.

The candidate D-port set information provided to the UE includes a plurality D-ports to be used between the UE and the eNB. The UE and/or the eNB can select one of the D-ports for transmission/reception. For example, the eNB notifies the UE of the D-port1, D-port2, and D-port3, and the UE can request use of one of the D-ports referred to in the notification.

Table 1 corresponds to an example of a D-port subset, candidate D-port set, and active D-port set for use in the system according to an embodiment of the present invention.

TABLE 1

| D-port superset | Candidate D-port set | Active D-port set |
| --- | --- | --- |
| D-port0 | D-port0 | D-port0 |
| D-port1 | D-port1 | |
| D-port2 | D-port2 | |
| D-port3 | D-port3 | |
| D-port4 | | |
| D-port5 | | |
| D-port6 | | |
| D-port7 | | |

In Table 1, the D-port superset includes D-port0 to D-port7. The D-port superset is a set of all of the D-ports included in the cell. The candidate D-port set is a subset of the D-port superset that is determined at step 635, and a notification of this determination is sent to the UE at step 640 in FIG. 6. The candidate D-port set is determined by the eNB and a notification of this determination is sent to the UE through RRC signaling. Since the candidate D-port set is information sent through RRC signaling, changes of the candidate D-port set are performed in a semi-static manner. The active D-port set is a subset of the candidate D-port set that is determined by the eNB in the DAS-related process between the UE and the eNB at step 645 of FIG. 6. The signal delivered from the eNB to the UE is transmitted through the distributed antennas identical to the active D-port set. The active D-port set is determined by the eNB and the UE is informed of the determined set through separate signaling. When the eNB notifies the UE of the active D-port set, the eNB performs the notification dynamically using Physical Downlink Control Channel (PDCCH) defined in LTE-A standard. The active D-port set can be managed in a UE-transparent manner without notifying the UE. More specifically, the eNB transmits PDSCH data through the active D-port set in communication mode without notifying the UE of the active D-port set such that the UE receives the PDSCH data through the corresponding D-port set. In this case, the UE can receive the downlink data from the eNB through the distributed antennas in good conditions without a notification sent through the PDSCH data.

Since the configuration information on the CSI-RS for C-port that is transmitted from the eNB to the UE is cell-specific information, the configuration information can be broadcast or transmitted in a cell-specific manner such that all the UEs can receive the information within the cell. Although according to the examples described herein, the configuration information on the C-port CSI-RS is broadcast or transmitted in a cell-specific manner, the information also can be transmitted through UE-specific transmission in accordance with embodiments of the present invention.

Figure 7:
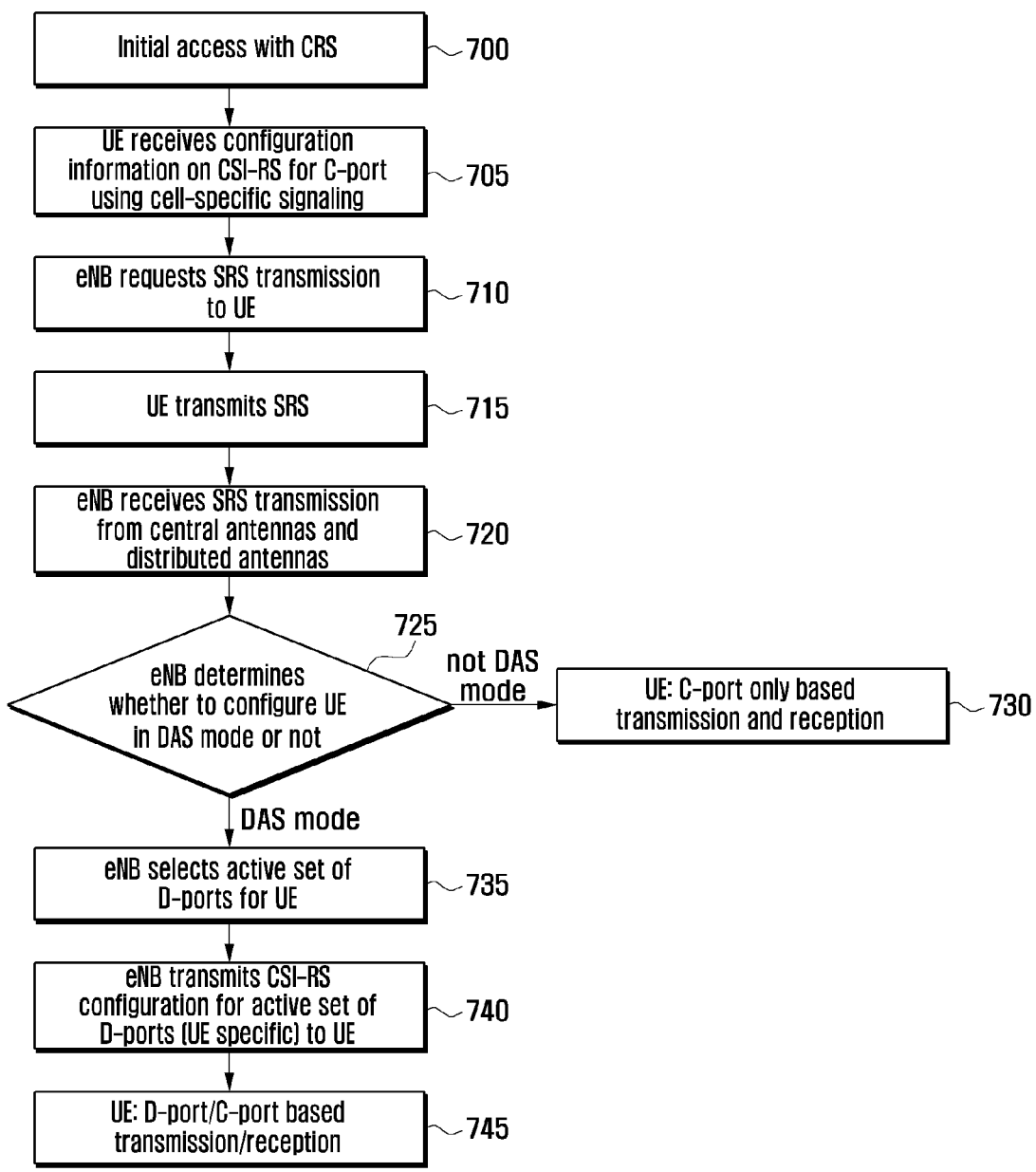
FIG. 7 is a flowchart illustrating a procedure performed by an eNB for allocating D-ports to a UE in a DAS-based LTE-A system according to another embodiment of the present invention.

FIG. 7 is a flowchart illustrating a procedure performed by an eNB for allocating D-ports to a UE in the DAS-based LTE-A system according to another embodiment of the present invention.

Referring to FIG. 7, steps 700 to 730 are performed in the same manner as steps 600 to 630 of FIG. 6. Therefore, a further description of steps 700 to 730 is omitted for clarity and conciseness. Upon a determination to configure the UE in a DAS mode at step 725, the eNB selects an active set of D-ports for the UE (where the selected active set is not a candidate D-port set) and notifies the UE of the active set of D-ports, in step 735. In the present example, since the active D-port set includes only one D-port, the process for selecting one of plural D-ports between the UE and the eNB is not necessary. After notification of the active set of D-ports, the eNB transmits CSI-RS configuration information for the candidate set of D-ports (which is UE-specific information) to the UE, in step 740. Upon receiving the CSI-RS configuration information, the UE performs communication using the C-port and D-port (i.e., d-port/C-port based transmission/reception), in step 745.

As described above, upon a determination to configure the UE in a DAS mode, the eNB can transmit the information for configuring the candidate D-port set or the active D-port set. Here, the candidate D-port set includes a plurality of D-ports available for communication between the UE and the eNB such that the UE and/or the eNB can select one of the D-ports for communication. More specifically, if the eNB notifies the UE of the candidate D-port set of D-ports, the UE can request the eNB to use one of the D-ports in the candidate D-port set. When the active D-port set is transmitted in place of the candidate D-port set, the step for selecting on of plural D-ports can be skipped, since, in such a case, the active D-port set includes only one D-port.

Figure 8:
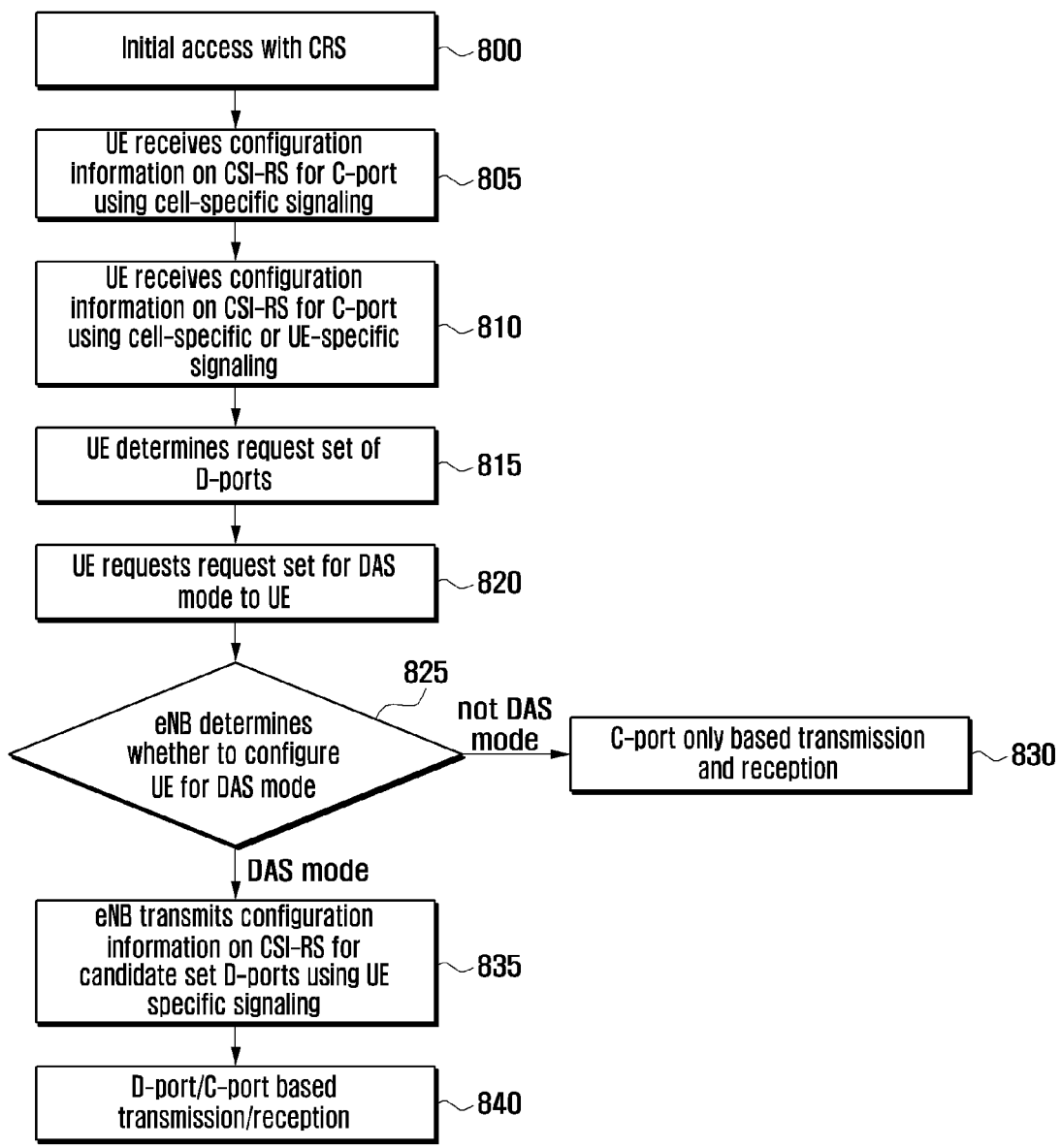
FIG. 8 is a flowchart illustrating a procedure performed by an eNB for allocating D-ports to a UE in a DAS-based LTE-A system according to still another embodiment of the present invention.

FIG. 8 is a flowchart illustrating a procedure performed by an eNB for allocating D-ports to a UE in the DAS-based LTE-A system according to still another embodiment of the present invention.

Referring to FIG. 8, the UE initially attempts access to a cell through CRS, in step 800, and the eNB transmits an initial access response to the UE in response to the initial access request. After the response to the initial access request is transmitted, the UE receives configuration information regarding the CSI-RS for C-port through cell-specific signaling, in step 805. The configuration information regarding the C-port CSI-RS, which is transmitted from the eNB to the UE, is cell-specific information receivable at any location within the service area of the cell. If the configuration information regarding the C-port CSI-RS is received, at step 805, the UE can perform communication using the C-port of the corresponding cell.

After the UE receives the configuration information, the UE transmits the configuration information on all of the D-ports of the corresponding cell (i.e., a D-port superset) to the UE, in step 810, and the UE receives the configuration information on the CSI-RS for D-port through cell-specific or UE-specific signaling. The information received by the UE includes the D-port CSI-RS configuration information and transmission power-related information. The UE determines the requested set of D-ports based on the information transmitted by the eNB, in step 815. The requested D-port set determined by the UE can differ from the final candidate D-port set. The UE transmits the requested D-port set to the eNB, in response to the eNB request for a requested set for use in DAS mode, in step 820.

If the requested D-port set transmitted by the UE is received, at step 820, the eNB determines whether to configure the UE for a DAS mode or a CAS mode, in step 825. Upon determining to configure the UE for the CAS mode, the eNB notifies the UE of the CAS mode determination result and performs C-port only-based transmission and reception, in step 830. Otherwise, upon determining to configure the UE for the DAS mode, at step 825, the eNB transmits the information on the configuration of candidate set and control and setting information necessary for operation in the DAS mode (i.e., configuration information on CSI-RS for candidate set of D-ports) through UE-specific signaling, in step 835. If the configuration information is received at step 835, the UE performs communication using D-port or C-port (i.e., D-port/C-port based transmission/reception), in step 840.

In the example according to FIG. 8, the UE can determine a D-port advantageous to itself by measuring the CSI-RS for the D-port. The CSI-RS for D-port can be used for determining a channel that has relatively superior channel conditions, as well as for measuring the channel status of the D-port. More specifically, the eNB and UE can determine which D-port is optimal for DAS using the received signal strength of the D-port. Meanwhile, a mobile communication system including multiple cells has to support roaming between cells, i.e. handoff. According to an embodiment of the present invention, the mobile communication system may always the C-port signal for handoff. More specifically, the received signal strength of the D-port is used for movement between D-ports while the received signal strength of the C-port is used for movement between C-ports.

Since the information regarding the C-port is cell-specific information, this information is transmitted such that the information is receivable in the entire service area of the cell. It is also possible to transmit the information related to C-port in a UE-specific manner according to embodiments of the present invention. For example, in the methods corresponding to FIGS. 6, 7, and 8, in transmitting the information on the C-port to the UE, the eNB can transmit the cell-specific information through UE-specific signaling in place of cell-specific signaling.

As described above, an antenna allocation apparatus and method for DAS-based cellular mobile communication system according to embodiments of the present invention may distribute antennas outward from the center of each cell, resulting in improving the quality of mobile communication service as compared to CAS-based systems. An antenna allocation apparatus and method for DAS-based cellular mobile communication system according to embodiments of the present invention may also be capable of selecting and allocating the antennas efficiently to improve the system throughput. Furthermore, an antennal allocation apparatus and method for DAS-based cellular mobile communication according to embodiments of the present invention may guarantee high data rates to the UEs regardless of their locations in the cell by configuring and allocating the central and distributed antennas deployed within the cell efficiently.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for communicating with a terminal of a base station in a mobile communication system, the method comprising:
transmitting configuration information on a plurality of antenna ports of reference signals (RSs) which comprise first type antenna ports and second type antenna ports;
receiving status information for at least one antenna port of an RS among the plurality of antenna ports of the RSs;
transmitting at least one indicator indicating at least one selected antenna port of an RS based on the status information; and
communicating with the terminal using the at least one selected antenna port of the RS,
wherein the first type antenna ports are for a centralized antenna and the second type antenna ports are for a distributed antenna.

2. The method of claim 1, wherein the at least one indicator comprises at least one first indicator indicating at least one selected first type antenna port and at least one second indicator indicating at least one selected second type antenna port.

3. The method of claim 2, wherein the terminal communicates with the centralized antenna using RSs of the at least one selected first type antenna port and communicates with the distributed antenna using RSs of the at least one selected second type antenna port.

4. The method of claim 1, wherein RSs of the first type antenna ports and RSs of the second type antenna ports are distinguished from each other by allocating different time-frequency resources to each antenna port.

5. The method of claim 1, wherein the first type antenna ports are predefined among the plurality of antenna ports of the RSs.

6. A method for communicating with a base station of a terminal in a mobile communication system, the method comprising:
receiving configuration information on a plurality of antenna ports of reference signals (RSs) which comprise first type antenna ports and second type antenna ports;
transmitting status information for at least one antenna port of an RS among the plurality of antenna ports of the RSs;
receiving at least one indicator indicating at least one selected antenna port of an RS; and
communicating with the base station using the at least one selected antenna port of the RS,
wherein the first type antenna ports are for a centralized antenna and the second type antenna ports are for a distributed antenna.

7. The method of claim 6, wherein the at least one indicator comprises at least one first indicator indicating at least one selected first type antenna port and at least one second indicator indicating at least one selected second type antenna port.

8. The method of claim 7, wherein the terminal communicates with the centralized antenna using RSs of the at least one selected first type antenna port and communicates with the distributed antenna using RSs of the at least one selected second type antenna port.

9. The method of claim 6, wherein RSs of the first type antenna ports and RSs of the second type antenna ports are distinguished from each other by allocating different time-frequency resources to each antenna port.

10. The method of claim 6, wherein the first type antenna ports are predefined among the plurality of antenna ports of the RSs.

11. A base station for communicating with a terminal in a mobile communication system, the base station comprising:
a transceiver for transmitting and receiving signals to and from the terminal;
a controller configured to control the transceiver to transmit configuration information on a plurality of antenna ports of reference signals (RSs) which comprise first type antenna ports and second type antenna ports, to receive status information for at least one antenna port of an RS among the plurality of antenna ports of the RSs, to transmit at least one indicator indicating at least one selected antenna port of an RS based on the status information, and to communicate with the terminal using the at least one selected antenna port of the RS,
wherein the first type antenna ports are for a centralized antenna and the second type antenna ports are for a distributed antenna.

12. The base station of claim 11, wherein the at least one indicator comprises at least one first indicator indicating at least one selected first type antenna port and at least one second indicator indicating at least one selected second type antenna port.

13. The base station of claim 12, wherein the terminal communicates with the centralized antenna using RSs of the at least one selected first type antenna port and communicates with the distributed antenna using RSs of the at least one selected second type antenna port.

14. The base station of claim 11, wherein RSs of the first type antenna ports and RSs of the second type antenna ports are distinguished from each other by allocating different time-frequency resources to each antenna port.

15. The base station of claim 11, wherein the first type antenna ports are predefined among the plurality of antenna ports of the RSs.

16. A terminal for communicating with a base station in a mobile communication system, the terminal comprising:
a transceiver for transmitting and receiving signals to and from the terminal;
a controller configured to control the transceiver to receive configuration information on a plurality of antenna ports of reference signals (RSs) which comprise first type antenna ports and second type antenna ports, and to transmit status information for at least one antenna port of an RS among the plurality of antenna ports of the RSs, to receive at least one indicator indicating at least one selected antenna port of an RS, and to communicate with the base station using the at least one selected antenna port of the RS,
wherein the first type antenna ports are for a centralized antenna and the second type antenna ports are for a distributed antenna.

17. The terminal of claim 16, wherein the at least one indicator comprises at least one first indicator indicating at least one selected first type antenna port and at least one second indicator indicating at least one selected second type antenna port.

18. The terminal of claim 17, wherein the terminal communicates with the centralized antenna using RSs of the at least one selected first type antenna port and communicates with the distributed antenna using RSs of the at least one selected second type antenna port.

19. The terminal of claim 16, wherein RSs of the first type antenna ports and RSs of the second type antenna ports are distinguished from each other by allocating different time-frequency resources to each antenna port.

20. The terminal of claim 16, wherein the first type antenna ports are predefined among the plurality of antenna ports of the RSs.

* * * * *